Figure 1:
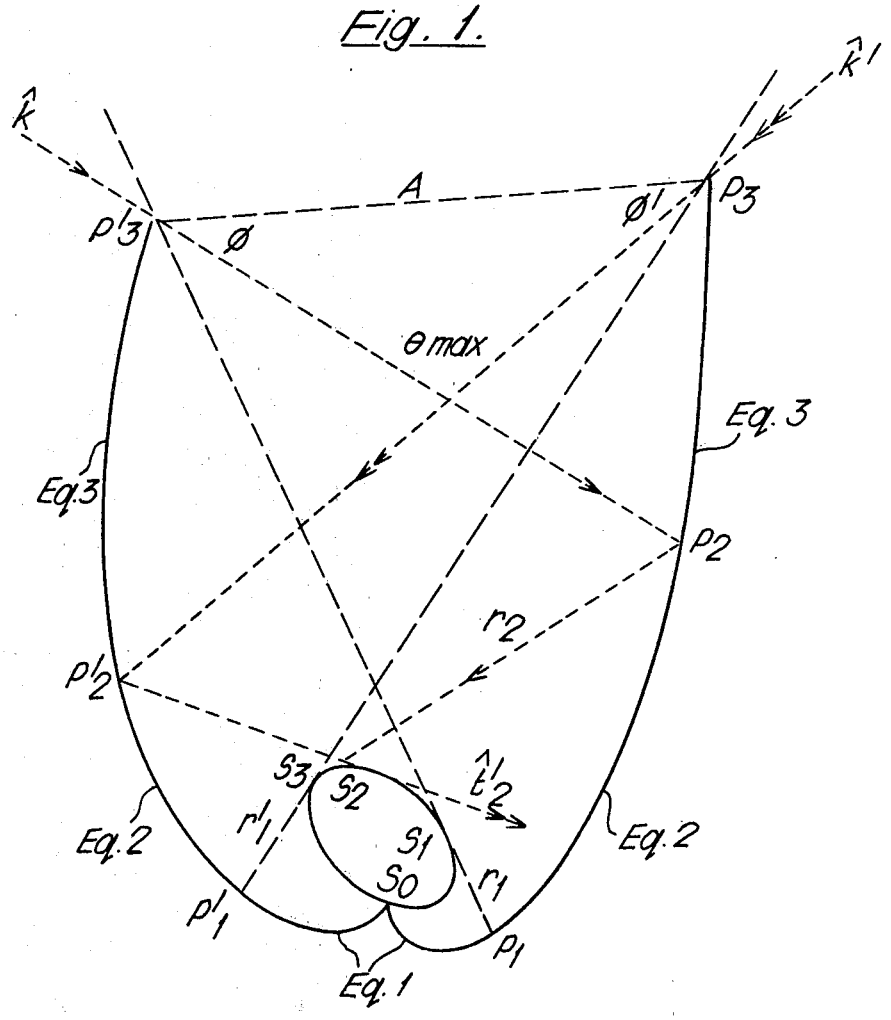

United States Patent [19]

Giutronich et al.

[11] 4,327,969
[45] May 4, 1982

[54] RADIATION CONCENTRATOR AND DISTRIBUTOR

[75] Inventors: John E. Giutronich, Kensington; David R. Mills, Randwick, both of Australia

[73] Assignee: Unisearch Limited, Kensington, Australia

[21] Appl. No.: 77,769

[22] Filed: Sep. 21, 1979

[30] Foreign Application Priority Data

Sep. 21, 1978 [AU] Australia ............... PD6047

[51] Int. Cl.³ ............... G02B 5/08; F24J 3/02; F21V 7/00
[52] U.S. Cl. ............... 350/296; 126/439; 362/297
[58] Field of Search ............... 350/293, 296; 126/438, 126/439; 362/297

[56] References Cited

U.S. PATENT DOCUMENTS

| 3,957,031 | 5/1976 | Winston. | |
|---|---|---|---|
| 3,974,824 | 8/1976 | Smith | 126/438 |
| 4,002,499 | 1/1977 | Winston. | |
| 4,089,047 | 5/1978 | Lüderitz | 126/438 X |
| 4,130,107 | 12/1978 | Rabl et al. | 126/438 |
| 4,230,095 | 10/1980 | Winston | 126/439 |
| 4,246,391 | 1/1981 | Lambert | 126/438 |

OTHER PUBLICATIONS

D. R. Mills & J. E. Giutronich, "Symmetrical and Asymmetrical Ideal Cylindrical Radiation Transformers and Concentrators", *J. Opt. Sec. Am.*, vol. 69, No. 2, Feb. 1979.
I. M. Bassett, G. H. Derrick, "The Collection of Diffuse Light onto an Extended Absorber", *Opt. and Quant. Elect.* 10, 1978, pp. 61-82.
D. R. Mills, J. E. Giutronich, "Three-Dimensional Ideal Concentrators for Distant Sources", *Optics Communications*, vol. 28, No. 3, Mar. 1979, pp. 268-274.
R. H. Smith, "Solergy Collector Concept", Proc. of Int. Conf. on Heliotechnique and Development, Development Analysis Associates Inc., Cambridge, MA (1976).
D. R. Mills, "The Place of Extreme Asymmetrical Non-Focussing Concentrators in Solar Energy Utilization", *Solar Energy*, vol. 21, pp. 431-434, Mar. 14, 1978.
A. Rabl, "Comparison of Solar Concentrators", *Solar Energy*, vol. 18, 1976, pp. 93-111.
D. R. Mills, J. E. Giutronich, "Asymmetrical Non-Imaging Cylindrical Solar Concentrators", *Solar Energy*, vol. 20, 1978, pp. 45-55.

*Primary Examiner*—F. L. Evans
*Attorney, Agent, or Firm*—Browdy and Neimark

[57] ABSTRACT

An ideal or near ideal radiation concentrator for a distant source of radiation or a radiation distributor in which a non concave linear radiation absorber or source is arranged between facing reflecting side walls to receive radiation reflected from the side walls or to emit radiation. One side wall is made up of at least a portion the curvature of which is in accordance with equation (2) of the specification and the other side wall including at least a portion the curvature of which is in accordance with equation (3) of the specification. Where a circular or other convex section absorber or source is employed it is preferred that each side wall commence at a point on the absorber or source, the curvature of the side wall adjacent the absorber or source being the involute of the cross-section of the absorber or source.

14 Claims, 6 Drawing Figures

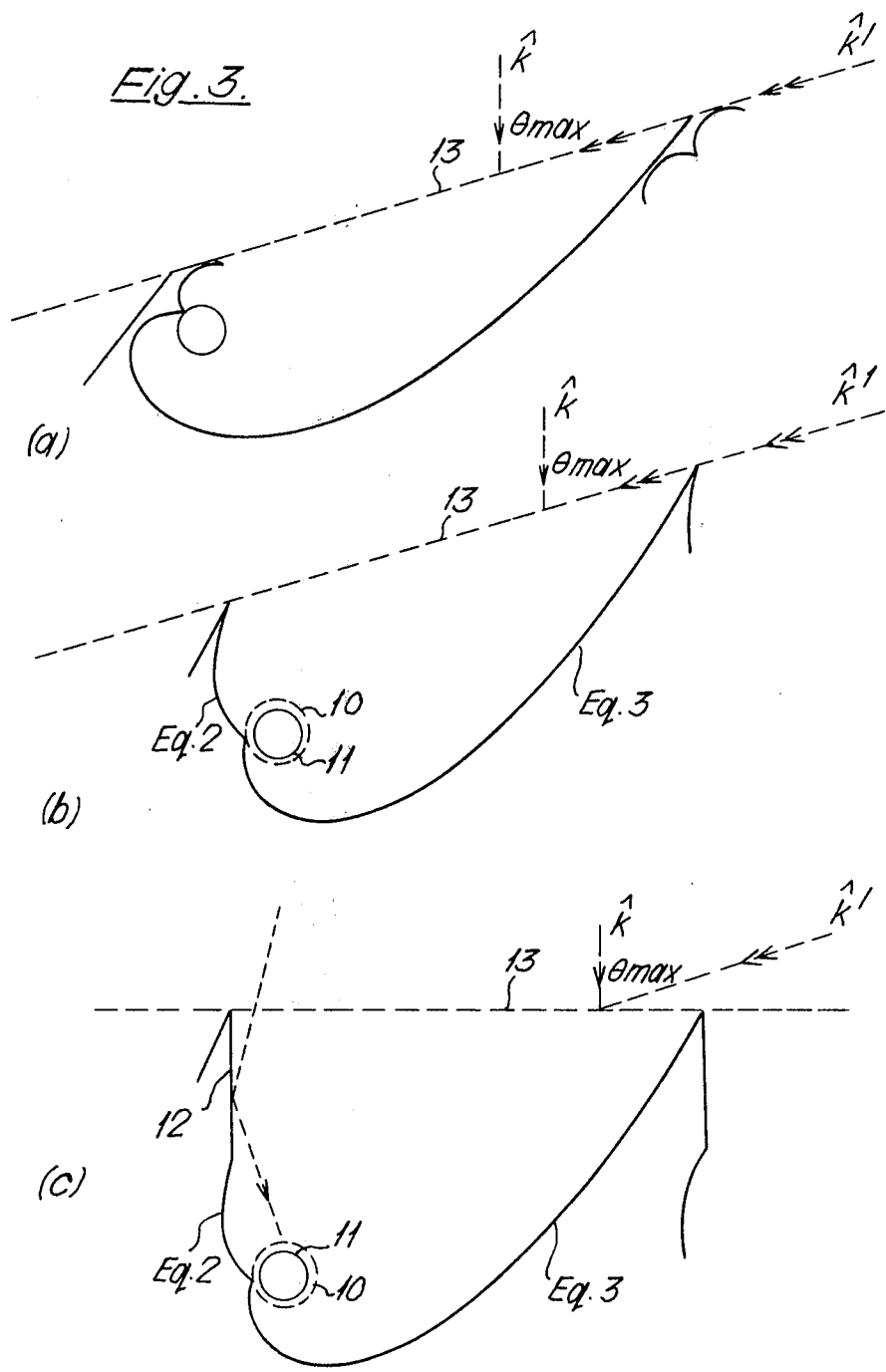

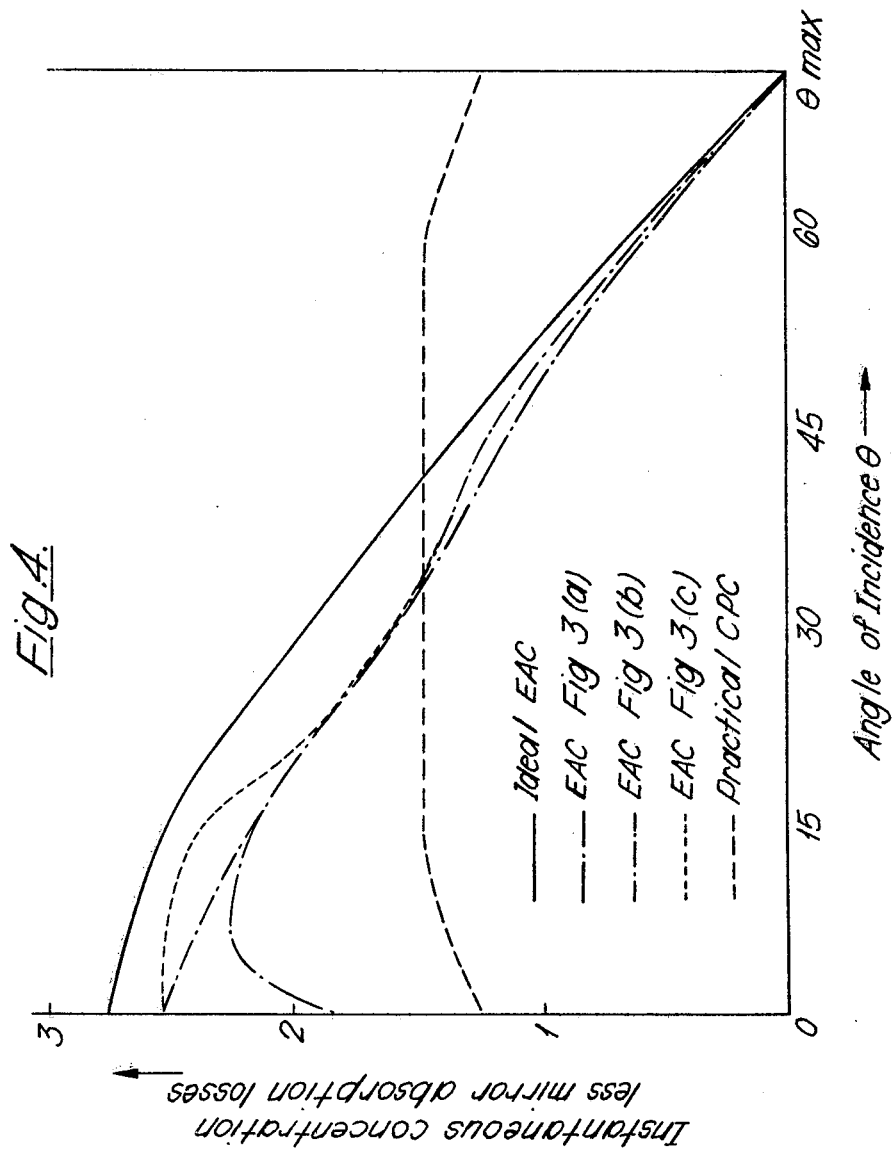

RADIATION CONCENTRATOR AND DISTRIBUTOR

R. Winston, in U.S. Pat. No. 4,002,499, has shown how to construct "ideal" two dimensional linear radiation concentrators using the general constraint that all rays from the extreme directions of the two-dimensional angle of acceptance are reflected tangent to the receiver surface. The term "ideal" is used in accordance with the definition contained in D. R. Mills and J. E. Giutronich, "Symmetrical and Asymmetrical ideal cylindrical radiation transformers and concentrators," *J. Opt. Soc. Am.* Vol. 69, No. 2, Feb. 1979 and which is set out on Page 5. Such a concentrator is useful for a distant point source of radiation, which in a solar concentrator (for example) may be approximated by the solar disc. Winston, in U.S. Pat. No. 3,957,031 has also described ideal concentrators for finite extended sources of radiation. These are constructed using the condition that rays from the boundary of the source are reflected tangent to the receiver surface.

The subject of the present invention relates to the design of a more general family of ideal, and practical near-ideal concentrators for distant radiation sources. Designs according to the invention may also be used as radiation distributors if a bright source is placed at the position of the receiver or absorber in the corresponding concentrator.

Concentrators and radiation distributors mirror profile development according to the invention requires a combination of the curvatures in the Winston patents cited to achieve its purpose. These combinations of curvature have not been previously used together in the construction of ideal and near-ideal concentrator profiles for distant sources.

The present invention consists in an ideal or near-ideal (a) radiation concentrator for a distant source of radiation or (b) a radiation distributor comprising a non concave linear radiation (a) absorber or (b) source arranged between facing reflecting side walls to (a) receive radiation reflected therefrom or (b) emit radiation, one side wall comprising at least a portion, the curvature of which is in accordance with equation (2) set out below, and the other side wall of which comprises at least a portion the curvature of which is in accordance with equation (3) set out below. Where circular or other convex section absorber or source is employed it is preferred that each side wall commence at a point on or near the absorber or source, the curvature of the side wall adjacent the absorber or source being the involute of the cross-section of the absorber or source.

The following general profile description will be devoted to the construction of ideal concentrators and distributors according to the invention, but the construction of practical, near-ideal concentrators and light distributors using a closely similar design philosophy is within the scope of the invention.

Figure 2:
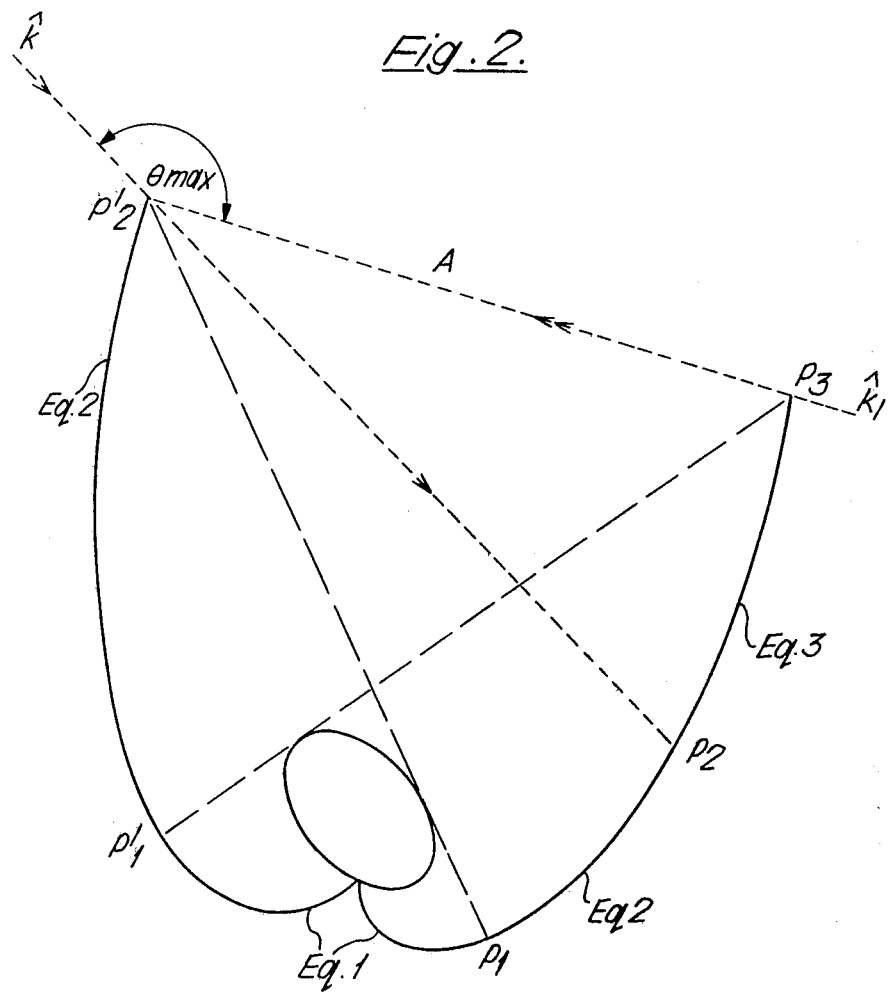

The following description is given with reference to the accompanying drawings in which:

FIG. 1 is a diagrammatic sectional view of a concentrator according to the invention, FIG. 2 is a similar view of a second form of concentrator according to the invention, FIG. 3a is a similar view of a known form of concentrator, FIGS. 3b and 3c are similar views of two further forms of concentrator according to the invention, and FIG. 4 shows a family of curves illustrating the performance of various forms of concentrator.

FIG. 1 shows an asymmetrical two-dimensional concentrator which accepts radiation from an acceptance angle $\hat{k} \longleftrightarrow \hat{k}' = \theta_{max}$ and distributes it upon the convex receiver shown. The mirror profile for the right side wall of the concentrator is composed of three sections. The first, an involute, extends from a point $S_o$ on the receiver surface to a point $P_1$ on the profile. This curved mirror segment, which will be called $S_oP_1$, is intended to reflect all rays crossing $S_2P_1$ either directly toward the receiver or indirectly toward the receiver after striking $S_oP_1$ one or more times. The length of arc from $S_o$ to a point S in $S_oP_1$ is given by $$S - S_o = (\vec{R} - \vec{P}) \cdot \hat{t} \qquad \text{Equation (1)}$$

where t is a unit vector tangent to the absorber perimeter at S, and R and P are vectors from $S_o$ to S and $S_o$ to P, respectively.

At $S_1$, therefore, $$S_1 - S_o = (\vec{R}_1 - \vec{P}_1) \cdot \hat{t}_1 = r_1$$

where $r_1$ is the distance from a point $P_1$ on the mirror profile to a point $S_1$ on the receiver perimeter along the tangent direction $\hat{t}_1$. The left profile side may be described in a similar manner using primed variables, giving $$S_1' - S_o' = (R_1' - P_1') \cdot \hat{t}_1' = r_1'$$

In the second section of the mirror profile, between $P_1$ and $P_2$, a new constraint is introduced. This is $$ds = d(l + r) \qquad \text{Equation (2)}$$

where l is the distance from $P_3'$ to P, s is the distance from $S_o$ to a point S on the surface of the absorber and r is the distance from a point P on the side wall to a point S on the absorber. This ensures that all rays which cross the concentrator aperture A and strike $P_1P_2$ will either strike the receiver directly after reflection or cross $P_1P_1'$. If Eq. 2 is integrated from $S_1$ to $S_2$, the result is $$S_2 - S_3 = \int_{P_1}^{P_2} d(l + r)$$

for the left profile side, and $$S_2' - S_1' = (l_2' + r_2') - (l_1' + r_1')$$

for the right profile side.

Between $P_2$ and $P_3$, the profile uses a different curvature. This curvature has the property that all rays from the direction $\hat{k}$ incident upon $P_2P_3$ are reflected tangent to the receiver, and is described by $$\frac{d\vec{P}}{ds} \cdot t = \frac{d\vec{P}}{ds} \cdot \hat{k} \qquad \text{Equation (3)}$$

The direction $\hat{k}$ may be taken as one limiting direction within the angle of acceptance because all rays crossing A which strike $P_2P_3$ from directions anti-clockwise to $\hat{k}$ will miss the receiver and be reflected away.

From FIG. 1

$$\vec{P} = \vec{R} - r\hat{t} \text{ where } \hat{t} = \frac{d\vec{P}}{ds}$$

and $$\frac{d\vec{P}}{ds} \cdot \hat{t} = 1 - \frac{dr}{ds} = \frac{d\vec{P}}{ds} \cdot \hat{k}$$

Integrating from $S_2$ to $S_3$, $$(S_3 - S_2) - (r_3 - r_2) = (\vec{P_3} - \vec{P_2}) \cdot \hat{k}$$

The perimeter of the receiver, $S_p$, may now be determined in terms of the concentrator dimensions, and it is found that $$S_p = (S_1 - S_0) + (S_2 - S_1) + (S_3 - S_2) + (S_0 - S_3)$$

$$= r_1 + (l_2 + r_2) - (l_1 + r_1) + (r_3 - r_2) + (\vec{P_3} - \vec{P_2}) \cdot \hat{k} + r_1'$$

$$= l_2 - l_1 + r_3 + r_1' + (\vec{P_3} - \vec{P_2}) \cdot \hat{k} \text{ (right side)}$$

$$= l_2 - l_1 + r_3' + r_1 + (\vec{P_3}' - \vec{P_2}') \cdot \hat{k}' \text{ (left side)}$$

Since $r_1 = r_3'$ and $r_3 = r_1'$, it follows that $$S_p = \tfrac{1}{2}[l_2 + l_2' + (\vec{P_3} - \vec{P_2}) \cdot \hat{k} + (\vec{P_3}' - \vec{P_2}') \cdot \hat{k}']$$

The direction of $\hat{k}$ and $\hat{k}'$ are taken to make angles of $\phi$ and $\phi'$ respectively with the aperture A, as shown in FIG. 1. Therefore, from the geometry of the figure, $$l_2 = A \cos \phi - (\vec{P_3} - \vec{P_2}) \cdot \hat{k}$$

$$l_2' = A \cos \phi' - (\vec{P_3}' - \vec{P_2}') \cdot \hat{k}'$$

and, after substitution into Eq. 5, $$S_p = \tfrac{1}{2}[A(\cos \phi + \cos \phi')]$$

The ratio of entrance aperture width to receiver perimeter is, therefore $$A/S_p = 2/(\cos \phi + \cos \phi')$$

In a previous paper, it (D. R. Mills and J. E. Giutronich. Symmetrical and Asymmetrical ideal cylindrical radiation transformers and concentrators. J. Opt. Soc. Am. Vol. 69, No. 2, Feb. 1979) was shown that, in order to be ideal, a concentrator must possess an entrance to exit aperture ratio of $A_1/A_2$ such that $$A_1/A_2 = [\sin (\theta_{max}/2) \sin (\phi' + \theta_{max}/2)]^{-1}$$

$$= 2/[\cos \phi' - \cos (\phi' + \theta_{max})]$$

From FIG. 1, $\phi = \pi - \phi' - \theta_{max}$ giving $$A_1/A_2 = 2/(\cos \phi + \cos \phi')$$

Hence, the concentrator is ideal. It should be noted, however, that in FIG. 1 no radiation is permitted to strike the receiver directly from outside $\hat{k} \leftrightarrow \hat{k}'$; only radiation within $\theta_{max}$ may be accepted by an ideal concentrator (I. M. Bassett and G. H. Derrick. The collection of light onto an extended absorber. concentrators. J. Opt. Soc. Am. Submitted for publication). The construction of the concentrator must fulfill this requirement.

Ideal distributors, in which the exist angle for rays at the exit aperture is restricted, and nearly ideal concentrators, in which some rays may strike the receiver from outside $\theta_{max}$ may both be constructed using the new method with appropriate modifications (Winston U.S. Pat. No. 3,957,031; and D. R. Mills and J. E. Giutronich. Symmetrical and Asymmetrical ideal cylindrical radiation transformers and concentrators. J. Opt. Soc. Am. Vol. 69, No. 2, Feb. 1979).

A special case of a concentrator according to the invention, occurs if the Eq. 3 curve section is eliminated (FIG. 2) on one side of the concentrator. If $P_2'P_3'$ is eliminated, in order for the concentrator to remain ideal, $P_1'P_2'$ must be extended to meet the shadow line $\hat{k}$ to prevent rays from outside $\theta_{max}$ striking the absorber directly. Using methods similar to those in the last section, such a concentrator may easily be proved to be ideal. The acceptance angle for the new concentrator will be the angle between $\hat{k}$ and the aperture A. Because one extreme ray direction runs parallel to the aperture, the concentrator may be described as an Extreme Asymmetrical Concentrator (EAC), as described (D. R. Mills, The place of extreme asymmetrical concentrators in solar energy utilization. Solar Energy. In press).

EAC's have several important advantages for Solar Energy Collection and light distribution. A completely stationary EAC system of solar concentrators can be oriented so that the yearly motion of the sun changes the yearly output of the system in a way which matches probable demand patterns. In this way, energy is more efficiently utilized because it arrives at the time of year required.

An occasionally (seasonally to monthly) tilting EAC system of higher concentration can out-perform symmetrical concentrator systems because the sun can be kept in the high concentration region of the acceptance angle. An ideal EAC gives the highest possible peak instantaneous concentration of any concentrating system, so that if the sun is kept in the high concentration region, the time-averaged concentration performance will be the best possible.

If frequently (weekly) tilted systems the daily movements of the sun can also be used to give increased time-averaged performance over that of symmetrical systems suggested by Winston.

The properties of EAC concentrators have been extensively discussed by Smith, (R. H. Smith. Proc. of Int. Conf. on Heliotechnique ad Development. Pp. 251. Development Analysis Associates Inc., Cambridge, Mass. 1976), Rabl (A. Rabl. Comparison of solar concentrators. Solar Energy 18, 93 1976), and I. M. Bassett and G. H. Derrick, "The collection of light onto an extended absorber," *Opt. and Quant. Elect.*, 10. 61–82 (1978); D. R. Mills and J. E. Guitronich, "Asymmetrical Non-Imaging Cylindrical Solar Concentrators," *Solar Energy*, 20, 45–55 (1978). However previously EAC designs in the literature, such as the design after Smith in FIG. 3(a), are difficult to cast or form in one piece. This fact leads to higher manufacturing costs. In addition, they have suffered from a high average number of reflections and, therefore, higher absorption losses in the mirror surface.

The design in FIG. 3(b) according to the invention results in a nearly ideal concentrator in which the receiver tube is fully exposed to all directions within the acceptance angle. In addition, the mirror is kept relatively close to the receiver, so that the latter occupies a relatively larger solid angle from the point of view of rays being reflected from the mirror. Both considerations tend to reduce the average number of reflections.

Note that the profile 3(b) is designed for use with a cover tube 10. Instead of eliminating the mirror profile in the region between the cover tube 10 and the absorber constituted by the receiver tube 11, the profile has been designed so that the involutes coincide at the cover tube surface (i.e. $S_o \neq S_o'$). This allows an increase in real aperture area which largely compensates for the loss in thermal output due to rays passing through the gap between receiver and mirror.

The right side of FIG. 3(b) uses only involute plus Winton-Hinterberge (Eq. 3) curvature, while the left side uses only an involute plus a section described by Eq. 2. Considerable freedom of symmetry and absorber pipe location may be obtained by using various combinations of these curvatures, however.

The profile FIG. 3(c) is similar to 3(b), but uses as additional plane section of mirror 13 to reduce both cover glass area 13 and reflection losses from the cover. Although this increases mirror area, it would be a cost-effective measure in a concentrator composed of plastic reflective film bonded to an inexpensive cast substrate and protected by a glass cover plate 13, and acceptance at low angles of incidence is enhanced. Unlike profile 3(a), profiles 3(b) and 3(c) may be moulded either singly or in nested modules.

FIG. 4 shows calculated net flux concentration corrected for absorption losses in a mirror of reflectivity equal to 0.9 as a function of radiation entrance angle. Profile 3(c) gives the best performance for low angles of incidence.

Reflection losses from the cover glass 13 and cover tube 11 are not included. A decrease in reflectivity would depress all the performance curves, but increase the performance advantage of concentrators constructed according to the invention.

In a cylindrical radiation distributor, a bright cylindrical source (such as a fluorescent tube) at the "focal line" of a distributor similar to that in FIG. 2(b) but ideal in construction will be usefully distributed throughout a lune, or "orange slice" shaped solid angle. This solid angle of illumination will be sharply cut-off at the edges and will be of maximum brightness, for no radiation strays outside this solid angle and none is reflected back into the source. In the "EAC" distributor, the illumination changes dramatically with direction within the solid angle. This makes possible a light distributor which can be positioned on a stand or post which will illuminate large areas uniformly from the side, because the orientation of the distributor can be such that, over a given illuminated surface, the fall-off of intensity due to the inverse square law is compensated by an increase in apparent distributor aperture. Combinations of such distributors can provide very even illumination over wide areas (i.e. sport grounds, large rooms) without dazzling those outside the illuminated area. If the concentrator is not ideal, some radiation spillage may occur at the edges of the solid angle of illumination, but this may not be serious. Distributors of the general type described may also prove useful along with their non-ideal derivatives.

An essential distinguishing feature of the invention is the use of at least one curved mirror segment obeying Eq. 2 to provide a concentrator for a distant source. It is preferred that an involute and at least one section after Eq. 3 be used in the construction of a complete profile. The addition of one or more plane mirror sections as, for example, in FIG. 3(c) may be used as an alternative mode of construction. A curve section from Eq. 2 and a curve section from Eq. 3 in a near ideal concentrator may be used. Any flat or convex receiver may be accommodated in concentrators according to the invention. Beginning the involute sections at different points on the receiver surface may be utilized as a means of accommodating a cover tube in either the concentrator or radiation distributor. Use may be made of a larger receiver than for the ideal case as a means of reducing the average angle of incidence of rays at the receiver surface of a concentrator. Modification of the mirror profile may be effected to reduce average ray angle of incidence on the surface of the receiver of a concentrator. Plane segments of mirror may be used to approximate the curves described. A concentrator according to the invention may be used as a secondary concentrator to further concentrate radiation already concentrated by other means. A radiation distributor according to the invention may be used to direct radiation from a cylindrical source to another reflector or distributor for subsequent distribution.

The claims defining the invention are as follows:

1. An ideal or near-ideal radiation concentrator for a distant source of radiation comprising a non-concave linear radiation absorber arranged between facing reflecting side walls to receive radiation reflected therefrom, said side walls each having an edge, which edges define between them an aperture through which radiation passes to said absorber and said side walls meeting along a line on or adjacent a surface of said absorber opposite said aperture, one side wall comprising at least a portion, the curvature of which is in accordance with equation (2) set out below, and the other side wall of which comprises at least a portion, the curvature of which is in accordance with equation (3) set out below:

$$ds = d(l+r) \qquad \text{equation (2)}$$

$$\frac{d\vec{P}}{ds} \cdot \vec{t} = \frac{d\vec{P}}{ds} \cdot \hat{k} \qquad \text{equation (3)}$$

where s is the distance along the perimeter of the cross section of the absorber measured from a point on the line along which said side walls meet to a point P on said one side wall;

ds is an incremental change in s according to the conventions of mathematical calculus;

l is the distance along an incident light ray path from the edge of said one side wall defining the aperture to the point P;

r is the reflected ray path distance from P on said one side wall to a point on a face of the absorber opposite said aperture;

d (l+r) is an incremental change in the total ray path distance l+r according to the conventions of mathematical calculus;

$\hat{k}$ is a unit vector indicating the limiting direction of the concentrator receptance angle for radiation such that rays incident upon said other side wall at angles of incidence to the surface of the said other side wall less than $\hat{k}$ will miss the absorber upon reflection; and t is a unit vector indicating the direction of a ray which has been reflected once by said other side wall at point P and which strikes the face of the absorber facing said aperture tangentially.

2. A radiation concentrator as claimed in claim 1 wherein the absorber is circular or convex in section and each side wall commences on a point on the absorber, the curvature of the portion of the side wall adjacent the absorber being the involute of the cross-section of the absorber.

3. A radiation concentrator as claimed in claim 2 wherein one side wall is made up of a portion the curvature of which is an involute of the cross-section of the absorber, the curvature of the remainder being in accordance with equation (2) and the other side wall is made up of a portion the curvature of which is an involute of the cross-section of the absorber, a further portion the curvature of which is in accordance with equation (2) and a third portion which is in accordance with equation (3).

4. A radiation concentrator as claimed in claim 2 wherein both side walls are made up from a portion the curvature of which is an involute of the cross-section of the absorber, a portion the curvature of which is in accordance with equation (2) and a third portion which is in accordance with equation (3).

5. A radiation concentrator as claimed in claim 1 wherein at least one side wall is extended by means of a plane mirror.

6. A radiation concentrator as claimed in claim 1 wherein the absorber is circular or convex in section and is covered by a transparent cover tube and each side wall commences at a point of the cover tube, the curvature of the portion of the side wall adjacent the cover tube being involute of the cross-section of the cover tube.

7. A radiation concentrator as claimed in any one of claims 1 or 2–6 wherein the side walls are constituted by a plastic reflective film bonded to a substrate.

8. An ideal or near-ideal radiation distributor comprising a non-concave linear radiation source arranged between facing reflecting side walls to emit radiation, said side walls each having an edge, which edges define between them an aperture through which radiation from said source passes and said walls meeting along a line on or adjacent a surface of said source, one side wall comprising at least a portion, the curvature of which is in accordance with equation (2) set out below, and the other side wall of which comprises at least a portion, the curvature of which is in accordance with equation (3) set out below:

$$ds = d(l+r) \qquad \text{equation 2}$$

$$\frac{\overrightarrow{dP}}{ds} \cdot t = \frac{\overrightarrow{dP}}{ds} \cdot \hat{k}, \qquad \text{equation (3)}$$

where s is a distance along the perimeter of the cross section of the source of radiation measured from the point on the line along which said side walls meet to a point P on said one side wall;

ds is a incremental change in s according to the conventions of mathematical calculus;

l is the distance along a light ray path from the point P to the edge of said one side wall defining the aperture;

r is the ray path distance from P on said one side wall to a point on a face of the source of radiation opposite the aperture;

d (l+r) is an incremental change in the total ray path distance l+r according to the conventions of mathematical calculus;

$\hat{k}$ is a unit vector indicating the limiting direction of the distributor distribution angle for radiation such that rays incident upon said other side wall at angles of incidence to the surface of the said other side wall less than $\hat{k}$ will miss the source upon reflection; and t is a unit vector indicating the direction of a ray which has been reflected once by said other side wall at point P and which strikes the uppermost side of the source tangentially.

9. A radiation distributor as claimed in claim 8 wherein the source is circular or convex in section and each side wall commences on a point on the source, the curvature of the portion of the side wall adjacent the source being the involute of the cross-section of the source.

10. A radiation distributor as claimed in claim 9 wherein one side wall is made up of a portion the curvature of which is an involute of the cross-section of the source, the curvature of the remainder being in accordance with equation (2) and the other side wall is made up of a portion the curvature of which is an involute of the cross-section of the source, a further portion the curvature of which is in accordance with equation (2) and a third portion which is in accordance with equation (3).

11. A radiation distributor as claimed in claim 9 wherein both side walls are made from a portion the curvature of which is an involute of the cross-section of the source, a portion the curvature of which is in accordance with equation (2) and a third portion which is in accordance with equation (3).

12. A radiation distributor as claimed in claim 8 wherein at least one side wall is extended by means of a plane mirror.

13. A radiation distributor as claimed in claim 8 wherein the source is circular or convex in section and is covered by a transparent cover tube and each side wall commences at a point on the cover tube, the curvature of the portion of the side wall adjacent the cover tube being involute of the cross-section of the cover tube.

14. A radiation distributor as claimed in any one of claims 8 or 9, wherein the side walls are constituted by a plastic reflective film bonded to a substrate.

* * * * *

UNITED STATES PATENT AND TRADEMARK OFFICE
CERTIFICATE OF CORRECTION

PATENT NO. : 4,327,969
DATED : May 4, 1982
INVENTOR(S) : GIUTRONICH et al.

It is certified that error appears in the above-identified patent and that said Letters Patent are hereby corrected as shown below:

Column 2, line 11, change "$S_2P_1$" to --$S_1P_1$-- line 13, after "arc" insert --proceeding anti-clockwise line 14, delete "in $S_oP_1$" and insert --between points $S_o$ and $S_1$ or the receiver-- line 43, "$P_1P_1$" should read --$S_1P_1$--

Column 3, line 63, after "radiation" insert --originating outside $\hat{k} \leftrightarrow \hat{k}'$-- line 64, delete "directly from outside $\hat{k} \leftrightarrow \hat{k}'$"

*Signed and Sealed this*

*Third* Day of *August 1982*

[SEAL]

*Attest:*

GERALD J. MOSSINGHOFF

*Attesting Officer*     *Commissioner of Patents and Trademarks*